US010975998B2

(12) United States Patent
Unruh, Sr. et al.

(10) Patent No.: US 10,975,998 B2
(45) Date of Patent: Apr. 13, 2021

(54) SAFETY PLATE

(71) Applicant: Arnold E. Unruh, Sr., St. George, UT (US)

(72) Inventors: Arnold E Unruh, Sr., St. George, UT (US); Michael H. Walther, St. George, UT (US)

(73) Assignee: Arnold E. Unruh, Sr., St. George, UT (US)

( * ) Notice: Subject to any disclaimer, the term of this patent is extended or adjusted under 35 U.S.C. 154(b) by 0 days.

(21) Appl. No.: 16/359,871

(22) Filed: Mar. 20, 2019

(65) Prior Publication Data

US 2019/0219217 A1    Jul. 18, 2019

Related U.S. Application Data

(63) Continuation-in-part of application No. 29/664,167, filed on Sep. 21, 2018, now Pat. No. Des. 895,415, and a continuation-in-part of application No. 29/614,990, filed on Aug. 24, 2017, now abandoned.

(60) Provisional application No. 62/645,239, filed on Mar. 20, 2018.

(51) Int. Cl.
F16L 57/00      (2006.01)
E04G 21/30      (2006.01)
H02G 3/04       (2006.01)

(52) U.S. Cl.
CPC .............. *F16L 57/00* (2013.01); *E04G 21/30* (2013.01); *H02G 3/0406* (2013.01)

(58) Field of Classification Search
CPC ........... F16L 57/00; F16L 57/04; F16L 57/06; H02G 3/0406; E04G 21/30
See application file for complete search history.

(56) References Cited

U.S. PATENT DOCUMENTS

| | | | | |
|---|---|---|---|---|
| 5,836,130 A * | 11/1998 | Unruh | ...................... | F16L 3/223 52/698 |
| 6,779,232 B2 * | 8/2004 | Cerul | ........................ | E04B 2/80 16/2.1 |
| 6,901,628 B2 * | 6/2005 | Cerul | ........................ | E04B 2/80 16/2.1 |
| D523,567 S * | 6/2006 | Whisler | ................ | F16L 59/145 D25/199 |
| 7,071,410 B1 * | 7/2006 | Kiely | ...................... | F16L 57/00 174/135 |
| D582,918 S * | 12/2008 | Scott | ............................ | D14/432 |
| 7,601,918 B2 * | 10/2009 | Pamperin | .................. | F16L 5/00 16/2.1 |
| 7,977,576 B1 * | 7/2011 | Gowder | ................. | H02G 3/386 138/110 |

(Continued)

Primary Examiner — Rodney Mintz
(74) Attorney, Agent, or Firm — Gurr Brande & Spendlove, PLLC; Robert A. Gurr

(57) ABSTRACT

A safety plate has a first, concave side for abutting a pipe, a second, convex side opposite the first, concave side, an arcuate portion interposed between a first linear portion and a second linear portion, a first edge on the first arcuate portion, and a second edge on the second arcuate portion; wherein the distance between the first and second edges is less than an exterior diameter of the pipe. A method of using a safety plate involves forcing the first side of the safety plate to abut the pipe, the safety plate extending around at least half of the circumference of the pipe.

6 Claims, 8 Drawing Sheets

(56) References Cited

U.S. PATENT DOCUMENTS

| | | | | |
|---|---|---|---|---|
| 8,087,431 | B2* | 1/2012 | Souza | F16L 3/02 138/103 |
| 8,350,156 | B2* | 1/2013 | Gowder | F16L 57/00 138/110 |
| 8,952,274 | B2* | 2/2015 | Lalancette | H02G 3/22 138/110 |
| 9,360,139 | B1* | 6/2016 | Clement | F16L 13/10 |
| 9,574,699 | B2* | 2/2017 | Erickson | F16L 57/00 |
| 10,295,107 | B2* | 5/2019 | Fouard | F16L 57/00 |
| 10,627,019 | B1* | 4/2020 | Franklin | F16L 7/02 |
| D895,415 | S * | 9/2020 | Unruh, Sr. | F16L 7/02 D8/403 |
| 2004/0069507 | A1* | 4/2004 | Imamura | F16L 59/145 169/54 |
| 2004/0226131 | A1* | 11/2004 | Cervl | E04B 2/80 16/2.1 |
| 2006/0004366 | A1* | 1/2006 | Cerul | E04B 2/80 16/2.1 |
| 2007/0169820 | A1* | 7/2007 | Pamperin | F16L 5/00 137/343 |
| 2010/0037971 | A1* | 2/2010 | Scherer | F16L 1/11 138/110 |
| 2010/0294389 | A1* | 11/2010 | Souza | F16L 3/02 138/110 |
| 2011/0287278 | A1* | 11/2011 | Gowder | F16L 57/00 428/603 |
| 2011/0302845 | A1* | 12/2011 | McRoskey | E06B 7/367 49/460 |
| 2014/0345738 | A1* | 11/2014 | Hill | F16L 57/06 138/118.1 |
| 2016/0290546 | A1* | 10/2016 | Erickson | F16L 57/00 |
| 2017/0370516 | A1* | 12/2017 | Fouard | F16L 59/168 |
| 2018/0169933 | A1* | 6/2018 | LaPorte | F16L 59/163 |

* cited by examiner

FIG. 6
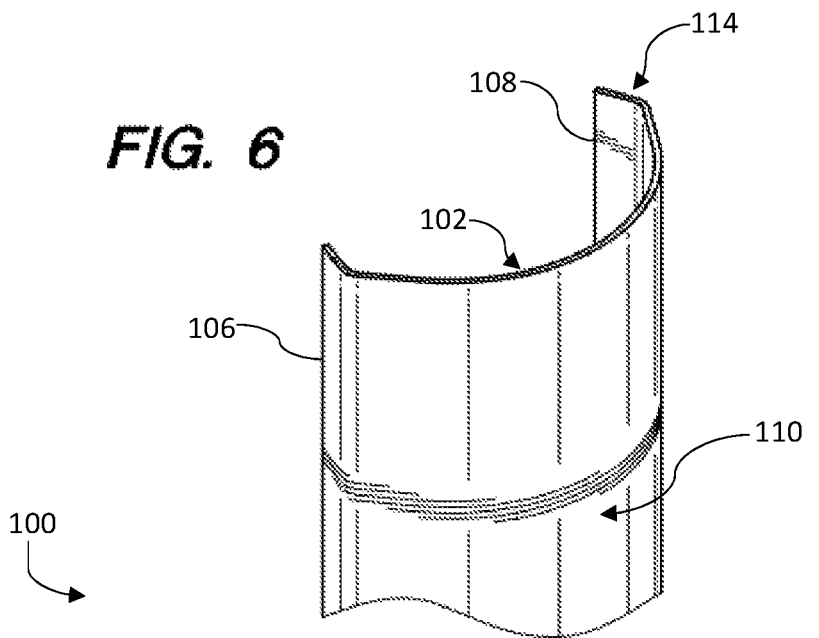
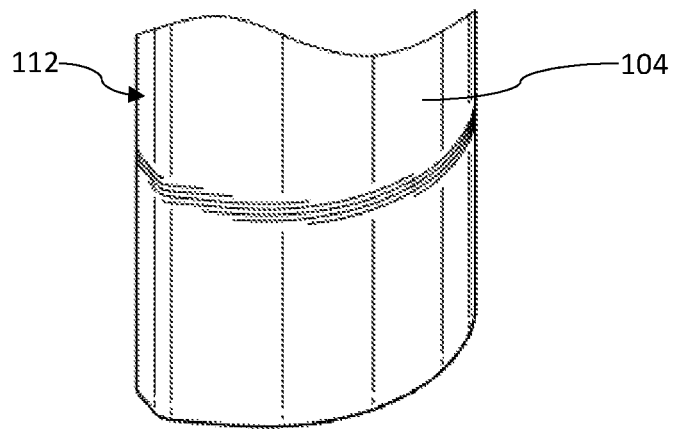

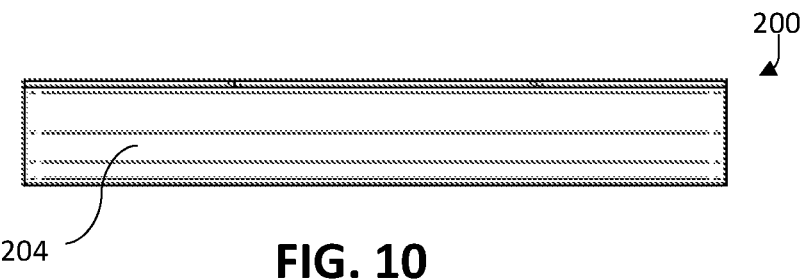
FIG. 10
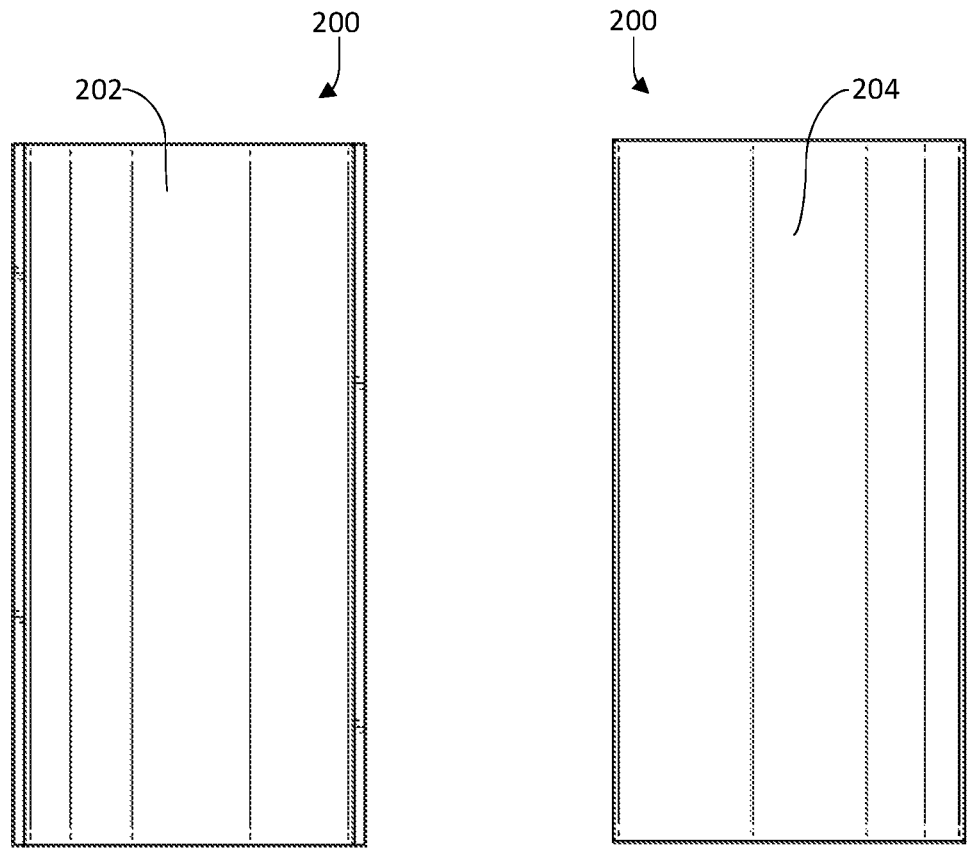
FIG. 11　　　　FIG. 12

SAFETY PLATE

CROSS-REFERENCE TO RELATED APPLICATIONS

This application is a continuation-in-part of U.S. design patent application 29/614,990 filed on Aug. 24, 2017, and is also a continuation-in-part of U.S. design patent application 29/664,167 filed on Sep. 21, 2018, and further claims the benefit of U.S. Provisional Application Ser. No. 62/645,239, filed on Mar. 20, 2018, all of which are incorporated herein by reference.

TECHNICAL FIELD

The present disclosure relates to building construction. More particularly, the present disclosure relates to a safety plate to prohibit nails, screws, or other objects from puncturing in-wall pipes, electrical wires, cable wiring, etc.

BACKGROUND

In home and building construction, a safety plate (also known as a nail plate, stud guard, or notch plate) is typically secured to a stud to prevent a nail or screw from penetrating one or more pipes passing through the stud. In other words, nails and screws are used to secure drywall or other materials to the studs. Without a safety plate, the nail may enter the stud and puncture the pipe or wiring passing through the stud. To prevent this from occurring, safety plates have been used (and are required in many jurisdictions to pass an inspection) that are secured to the exterior of a stud. However, there are several scenarios for which the safety plates in the art are ineffective. For example, if the stud gap is larger than the safety plate, builders often attempt to combine multiple safety plates to protect the pipe. However, combining safety plates is not ideal, as it creates weak points and may not properly protect the pipe or wiring. Accordingly, there is a need for a safety plate that does not require attachment to the studs.

In other scenarios, the safety plate is often larger than the required coverage area, often resulting in portions of the safety plate that remain unsecured from a stud (i.e., overhanging edges). Therefore, despite the prior art's attempts, there still remains a need for a safety plate that can easily protect a pipe in a wall regardless of the number of studs present, and that can protect the pipe at issue without worrying about the size or distance of studs in the wall in relation to the pipe. The present disclosure seeks to solve these and other problems.

SUMMARY OF EXAMPLE EMBODIMENTS

In one embodiment, a safety plate is shaped complementary to a pipe and comprises a first side, a second side, a first edge bent inwardly toward the first side, and second edge bent inwardly toward the first side, the bent edges allowing the safety plate to be secured to a pipe via tension.

In one embodiment, a safety plate comprises an arcuate portion and two linear portions, each linear portion having an edge, wherein the distance between the first linear edge and the second linear edge is less than the outer diameter of a pipe.

In one embodiment, a safety plate comprises a first side and a second side, wherein the first side comprises an adhesive for coupling to a pipe or other surface needing protection from nails, screws, or other devices that may puncture the item. In one embodiment, the safety plate is curved so as to conform to the shape of a pipe. In one embodiment, the safety plate is flat.

In one embodiment, a method of using a safety plate comprises placing the first side adjacent to a pipe and exerting a force on the second side of the safety plate, forcing the first edge and second edge of the linear portions to flex around the pipe, securing the safety plate to the pipe via tension, the first and second edges exerting an inward force on the pipe to secure the safety plate in position. In one embodiment, the safety plate is positioned within a pipe aperture in a stud.

In one embodiment, a method of using a safety plate comprises adhering the adhesive side of the plate to a pipe, the opposite side exposed and positioned so as to prevent puncture of the pipe. In one embodiment, the safety plate is positioned within a pipe aperture in a stud. In another embodiment, the safety plate is positioned on the exterior of a stud.

BRIEF DESCRIPTION OF THE DRAWINGS

FIG. 6 is a front perspective view of a safety plate of indeterminate length;
FIG. 10 is a side elevation view of a safety plate, the opposite side being a mirror image;
FIG. 11 is a back, first side, elevation view of a safety plate;
FIG. 12 is a front, second side, elevation view of a safety plate.

DETAILED DESCRIPTION OF EXAMPLE EMBODIMENTS

Figure 1:
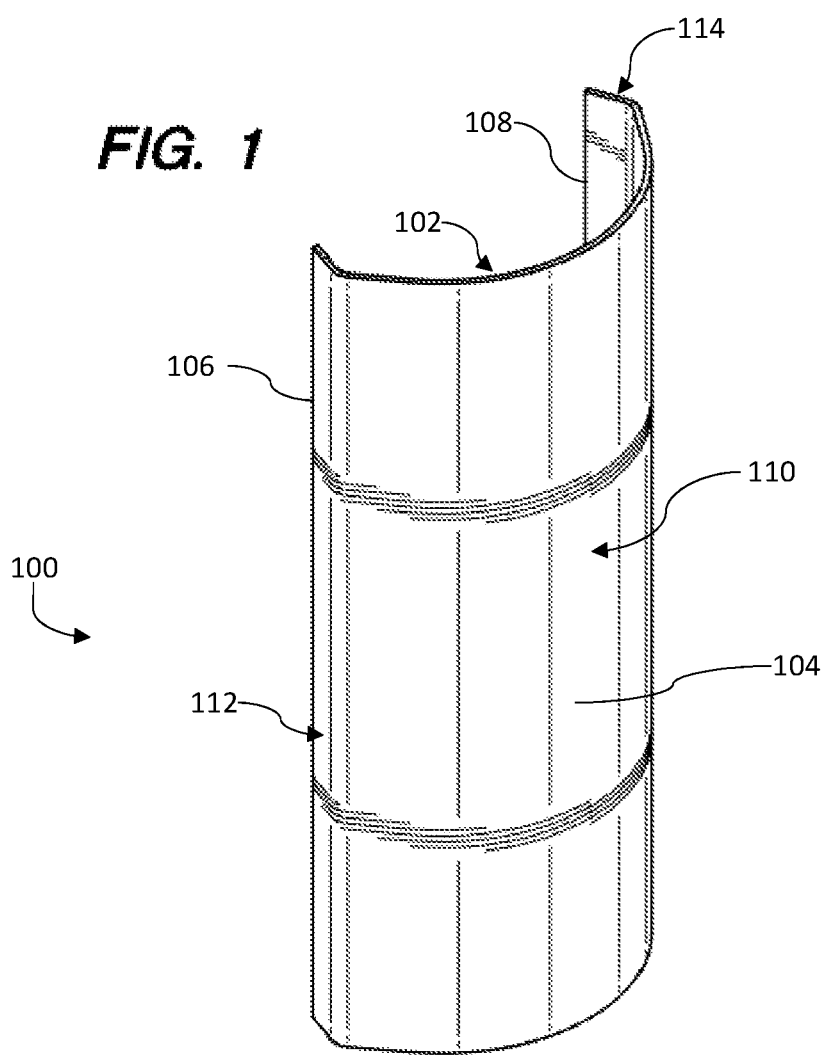
FIG. 1 is a front perspective view of a safety plate.
Figure 2:
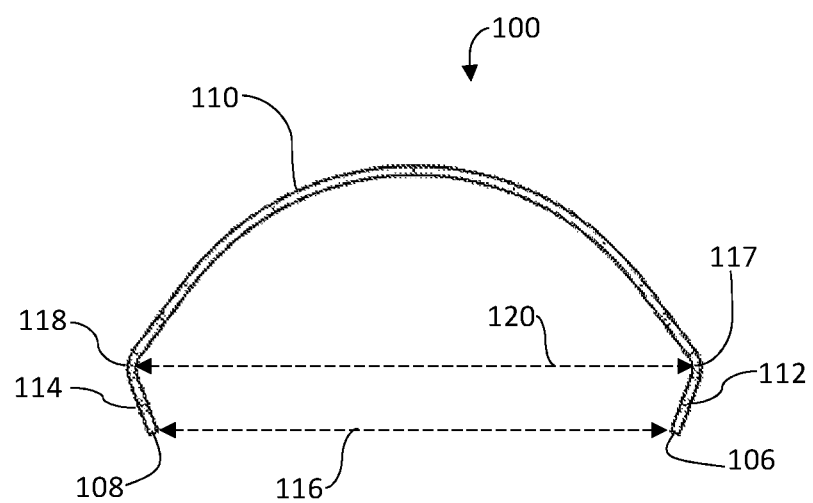
FIG. 2 is a top plan view of a safety plate.
Figure 3:
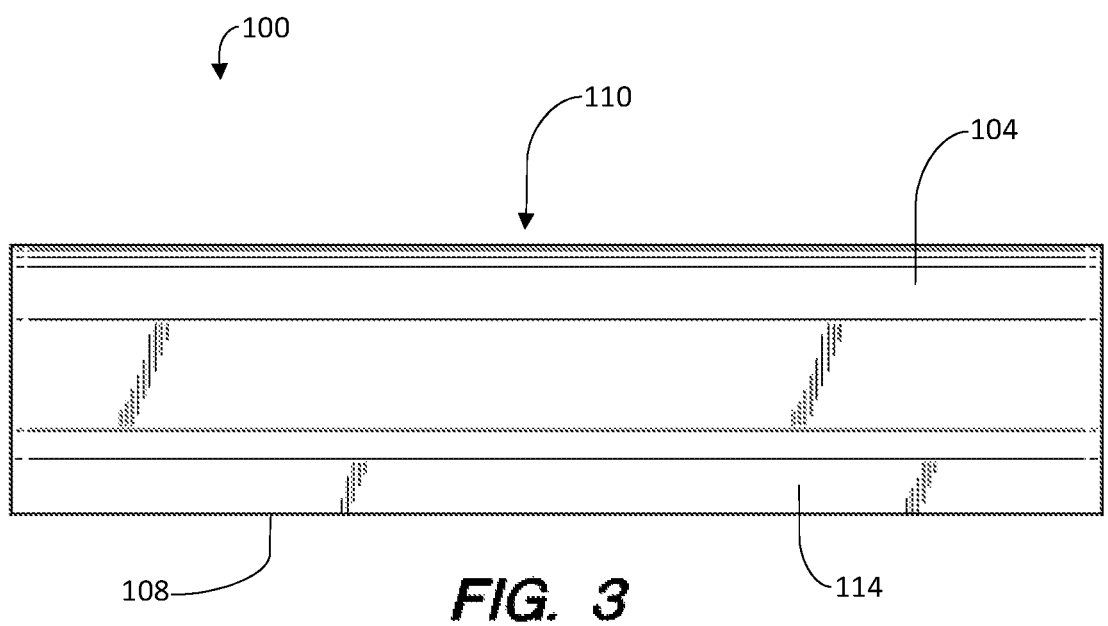
FIG. 3 is a side elevation view of a safety plate, the opposite side being a mirror image.
Figure 4:
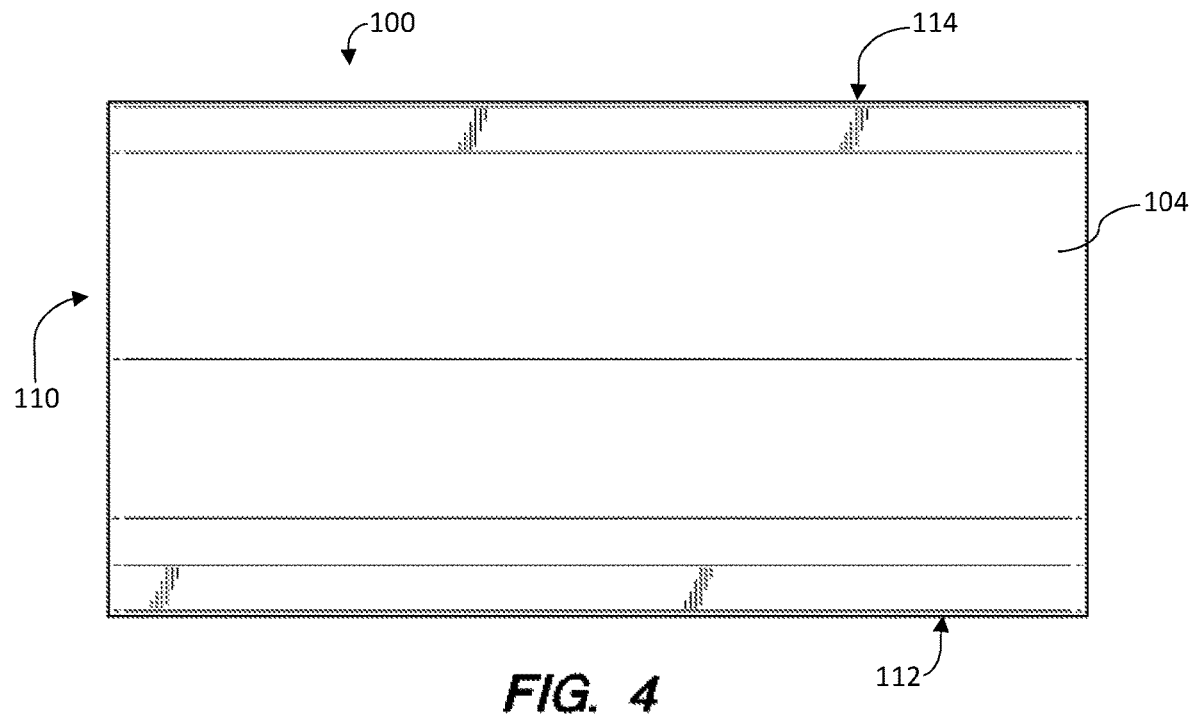
FIG. 4 is a front, second side, elevation view of a safety plate.
Figure 5:
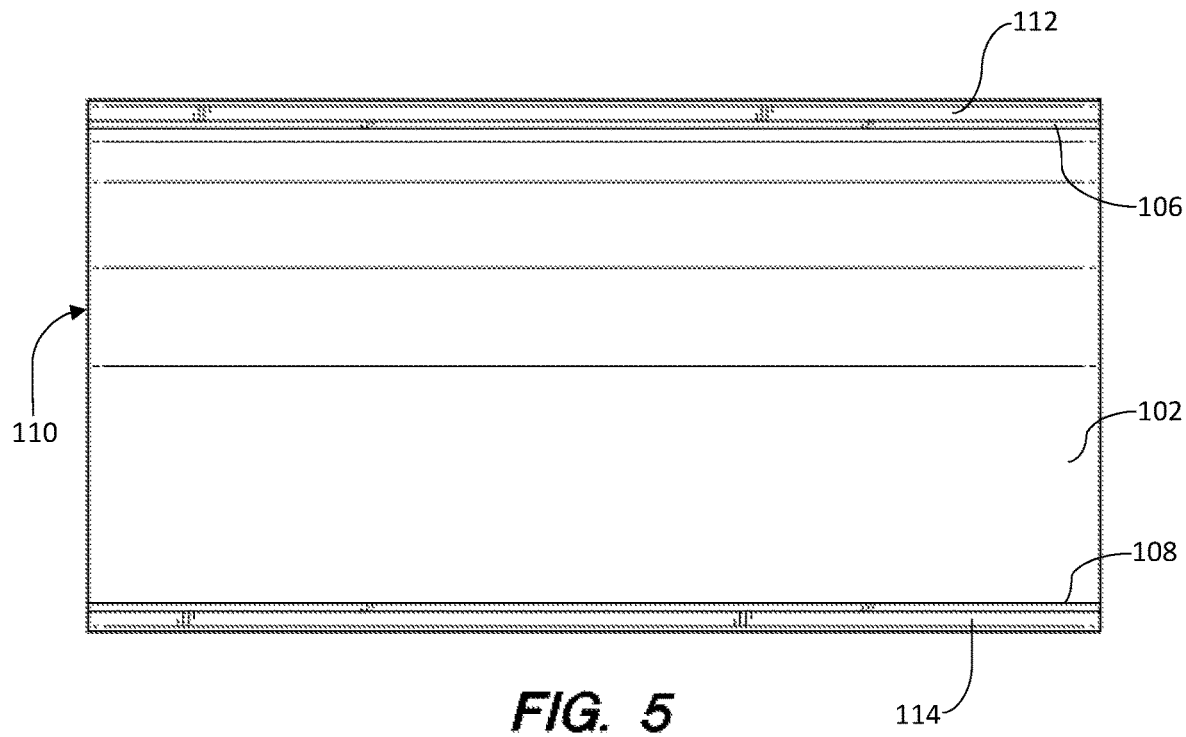
FIG. 5 is a back, first side, elevation view of a safety plate.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for a safety plate that can easily protect a pipe in a wall regardless of the number of studs present, and that can protect the pipe at issue without worrying about the size or distance of studs in the wall in relation to the pipe. Further, there is a need for a safety plate that does not require attachment to the studs. As will be appreciated from the below disclosure, the safety plate shown and described herein solves these needs and others.

Figure 7:
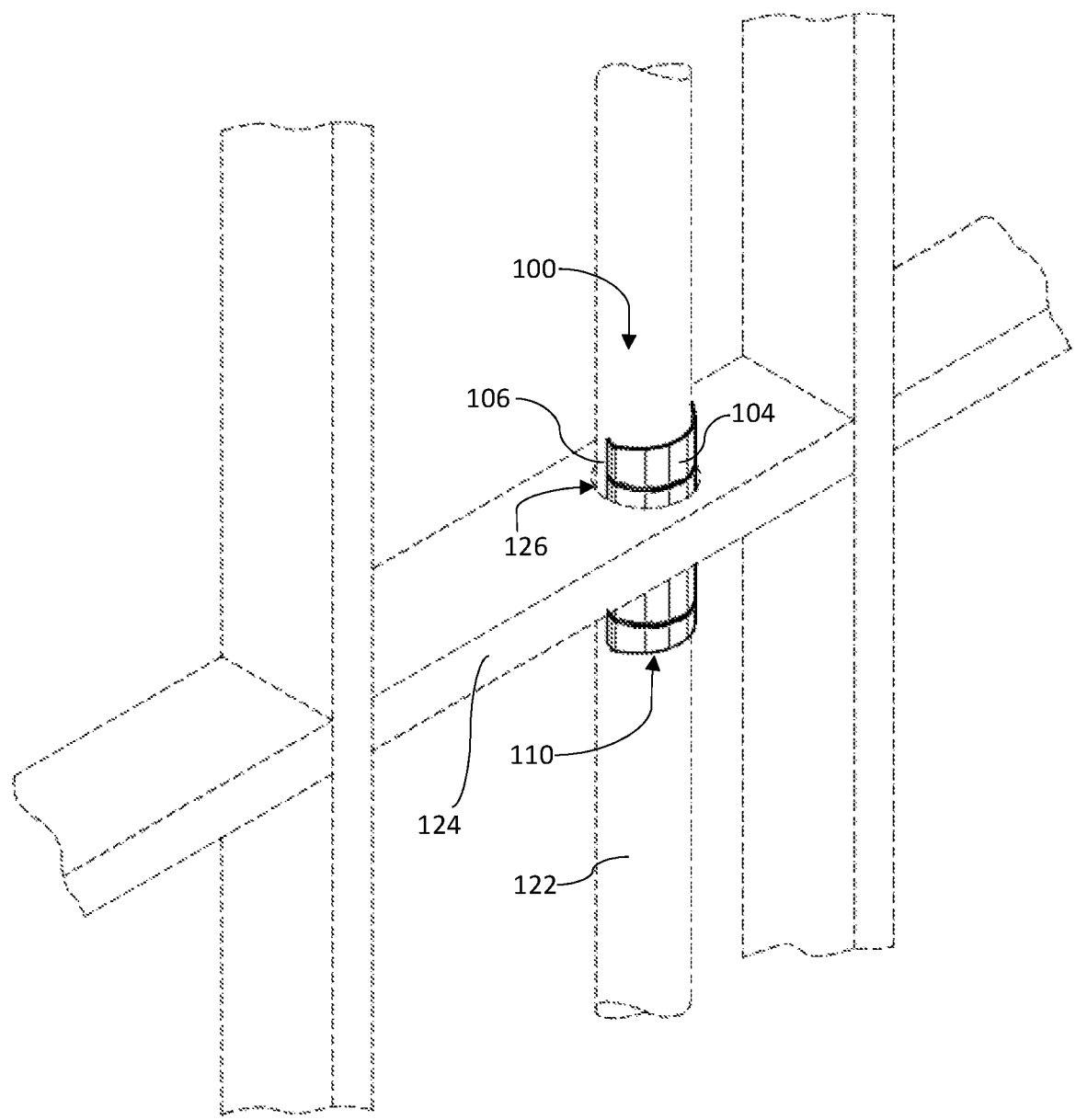
FIG. 7 is a front perspective view of a safety plate in use.
Figure 8:
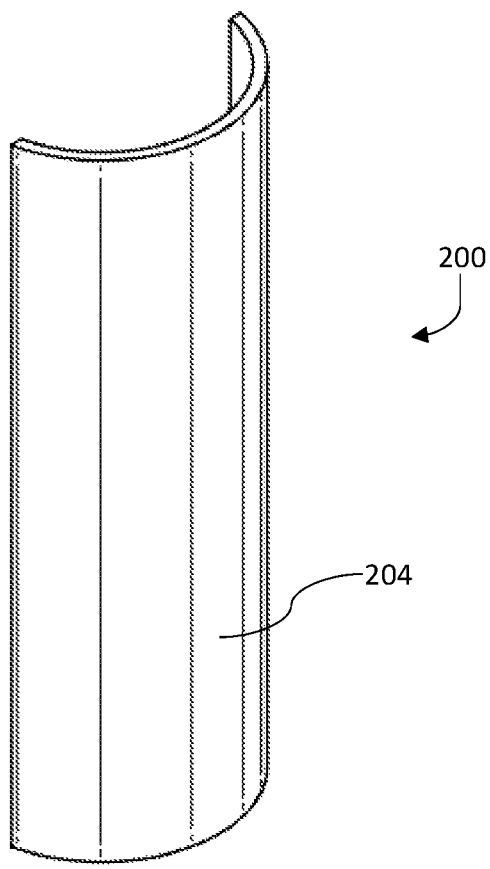
FIG. 8 is a front perspective view of a safety plate.
Figure 9:
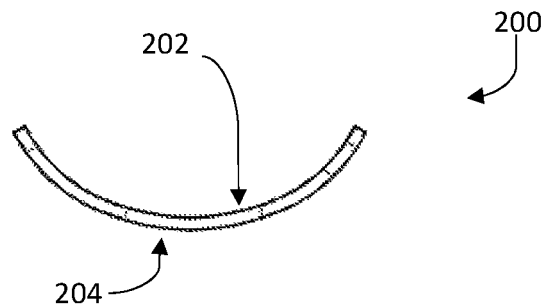
FIG. 9 is a top plan view of a safety plate.

In one embodiment, as shown in FIGS. 1-7, a safety plate 100 is shaped complementary to a pipe and comprises a first side (i.e., concave, back side) 102 and a second side (i.e., convex, front side) 104, a first edge 106 bent inwardly toward the first side 102, and second edge 108 bent inwardly toward the first side 104, the bent edges 106, 108 allowing the safety plate 100 to be secured to a pipe via tension, as shown in FIG. 7. The safety plate 100 therefore comprises an arcuate portion 110 (for complementing a pipe) and two linear portions 112, 114, the two linear portions 112, 114 terminating in first edge 106 and second edge 108, respectively. As shown best in FIG. 2, the distance 116 between the first edge 106 and the second edge 108 is less than the outer diameter of the pipe to which it will be secured. Further, a first angled junction 117 is formed at the junction of the arcuate portion 110 and the first linear portion 112, and second angled junction 118 is formed at the junction of the arcuate portion 110 and the second linear portion 114. The angle of the junction 117, 118 on the first (interior, concave side) is less than 180 degrees. In one embodiment, the angled junctions 117, 118 are in a range between 90 and 180 degrees. In one embodiment, the angled junctions 117, 118 are in a range from 45 to 135 degrees. In one embodiment, the distance 120 from the first angled junction 117 to the second angled junction 118 is greater than the outer diameter of a pipe. In one embodiment, the angled junctions 117, 118 do not contact the pipe.

Accordingly, the first edge 106 and the second edge 108 are placed so as to contact a pipe along their length. A user then exerts a force on the outer, second side 104 toward the pipe 122 (FIG. 7), which causes the safety plate 100 to flex such that the first edge 106 and second edge 108 slide around the pipe. In one embodiment, when the safety plate 100 is secured to the pipe 122, the first edge 106 and second edge 108 are at the mid-point of the pipe (i.e., the diameter of the pipe). In one embodiment, the first edge 106 and second edge 108 extend beyond the mid-point of the pipe (i.e., the safety plate 100 wraps around more than half of the circumference of the pipe 122). Further, as shown in FIG. 7, the safety plate 100 may be positioned within the pipe aperture 126. This is contrary to the prior art, which requires a safety plate of the prior art to be secured to a stud 124. It will be understood that the safety plate 100 is manufactured from materials sufficiently rigid and strong so as to prevent puncturing with a nail or screw, and that likewise exhibits memory so as to retain shape. The preferred materials comprise steel and may, or may not, be zinc plated. However, it will be appreciated that other materials may be used, such as metals, metal combinations, or even carbon fiber. Due to its strength and memory, and due to the fact that the distance 116 between the edges 106, 108 is less than the diameter of the pipe, the safety plate 100 remains engaged to the pipe and cannot be easily moved or removed. To remove, a user must exert sufficient pulling force to overcome the tension grip formed by the first and second edges 106, 108.

It will be appreciated that the safety plate 100 is a major improvement over the prior art. First, the safety plate 100 does not require nails, spikes, or tools to secure it in position—unlike the prior art that typically requires a hammer to secure to a stud. Second, the spacing between studs or the gap in a stud (such as when the pipe passes vertically through a floor) is irrelevant, as a user need only ever use one safety plate 100 to protect the pipe 122 running through the stud 124 or studs. Accordingly, the safety plate 100 saves time and labor, requires fewer uses at a worksite, and therefore is a source of significant savings to a builder.

In one embodiment, as shown in FIGS. 8-13, a safety plate 200 comprises a first side (concave) 202 and a second side (convex) 204, wherein the first side 202 comprises an adhesive for coupling to a pipe or other surface needing protection from nails, screws, or other devices that may puncture the pipe. In one embodiment, the safety plate 200 is curved (arcuate) so as to conform to the shape of a pipe. However, in an alternate embodiment, the safety plate is flat and comprises an adhesive on at least one side. In one embodiment, the adhesive is preferably of a peel and stick type, such as that produced by 3M Corporation. This allows a user to affix a safety plate 200 without tools.

Figure 13:
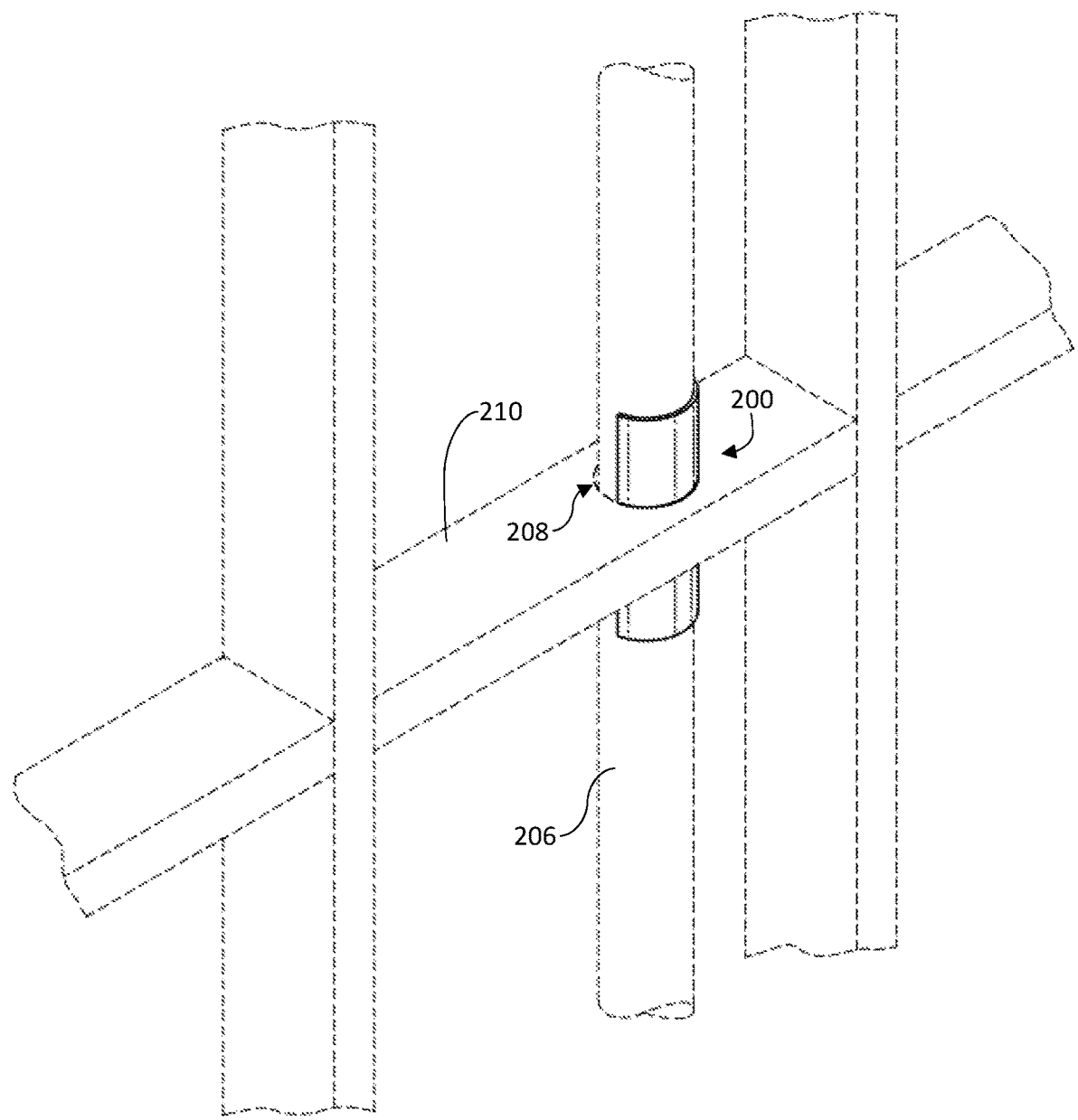
FIG. 13 is a front perspective view of a safety plate in use.

In one embodiment, as shown in FIG. 13, a method of using the safety plate 200 comprises adhering the first side 202 of the safety plate 200 to a pipe 206 (the first side 202 being ideally concave and shaped complementary to the pipe 206), the opposite, second side 204 positioned so as to prevent puncture of the pipe 206. As shown, the safety plate 200 may be positioned within a pipe aperture 208 in a stud 210. As appreciated, the safety plate 200 does not require tools to install to protect a pipe, and as a result is generally faster and safer for a user to install. Second, the safety plate 200 is secured directly to the pipe 206, as opposed to the stud 210 as done in the prior art.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A safety plate for preventing nails, screws, and other objects from puncturing in-wall pipes, the safety plate consisting of:
    a first, concave side configured to abut a respective said pipe;
    a second, convex side located opposite the first, concave side;
    a first angled junction leading to a first linear portion terminating in a first edge; and
    a second angled junction leading to a second linear portion terminating in a second edge;
    the first and second edges bent inwardly toward the first, concave side;
    wherein the first and second edges directly contact the pipe to form a grip on the pipe and wherein a distance between the first and second angled junctions is greater than a distance between the first edge and the second edge.

2. The safety plate of claim 1, wherein the distance between the first edge and the second edge is less than an exterior diameter of the pipe.

3. A safety plate for preventing nails, screws, and other objects from puncturing in-wall pipes, the safety plate consisting of:
    a first, concave side configured to abut a respective said pipe;
    a second, convex side located opposite the first, concave side;
    the first, concave side defining an arcuate portion interposed between a first linear portion and a second linear portion;
    a first angled junction located where the first linear portion meets the arcuate portion and a second angled junction located where the second linear portion meets the arcuate portion;
    a first edge terminating the first linear portion;
    a second edge terminating the second linear portion; and
    wherein a distance between the first and second edges is less than (a) a distance between the first and second angled junctions and (b) an exterior diameter of the pipe.

4. The safety plate of claim 3, wherein the distance between the angled junctions is greater than the exterior diameter of the pipe when the safety plate is coupled to the pipe.

5. A method of using the safety plate of claim 1, the method consisting of:
    placing the first edge and the second edge of the safety plate against the pipe, wherein the first edge terminating the first linear portion and the second edge terminating the second linear portion;
    applying a first force toward the pipe to the second side of the safety plate, wherein:
        upon application of the first force, the first and second edges flexing apart and sliding around a circumference of the pipe until the first side of the safety plate abuts the pipe, the first and second edges passing beyond a diameter of the pipe, but not coming into contact with one another; and
        after application of the first force, the first and second edges contacting and exerting a second, inward force on the pipe, thereby securing the safety plate to the pipe.

6. A method of using the safety plate of claim 3, the method consisting of:
    placing the first edge and the second edge of the safety plate against the pipe, wherein the first edge terminating the first linear portion and the second edge terminating the second linear portion;
    applying a first force toward the pipe to the second side of the safety plate, wherein:
        upon application of the first force, the first and second edges flexing apart and sliding around a circumference of the pipe until the first side of the safety plate abuts the pipe, the first and second edges passing beyond the diameter of the pipe, but not coming into contact with one another; and
        after application of the first force, the first and second edges contacting and exerting a second, inward force on the pipe, thereby securing the safety plate to the pipe.

* * * * *